L. W. EGGLESTON.
VALVE.
APPLICATION FILED DEC. 2, 1907.
902,952.
Patented Nov. 3, 1908.
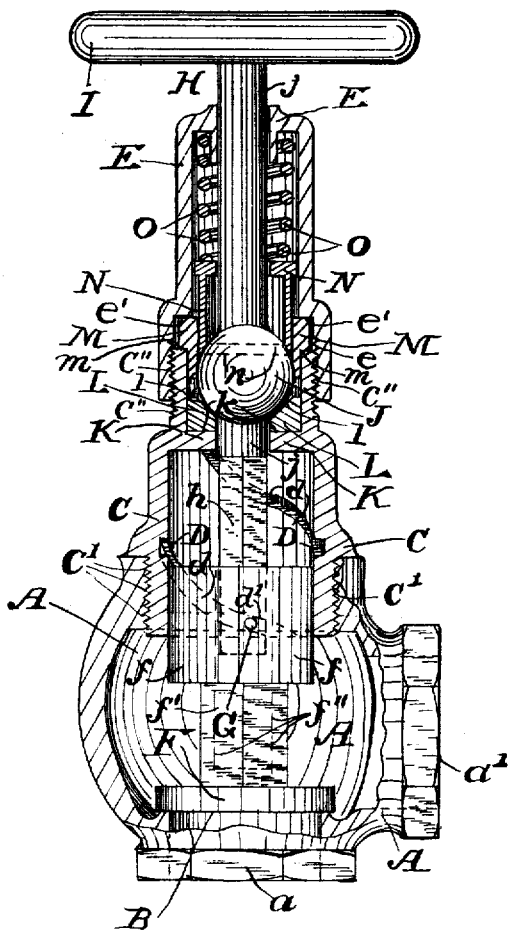
Witnesses:
R. A. Adams.
Edward J. Brown
Inventor;
Lewis Watson Eggleston
By Charles Turner Brown,
Atty.

UNITED STATES PATENT OFFICE.

LEWIS WATSON EGGLESTON, OF CHICAGO, ILLINOIS.

VALVE.

No. 902,952.

Specification of Letters Patent.

Patented Nov. 3, 1908.

Application filed December 2, 1907. Serial No. 404,677.

*To all whom it may concern:*

Be it known that I, LEWIS WATSON EGGLESTON, a citizen of the United States, and a resident of Chicago, in the county of Cook and State of Illinois, have invented certain new and useful Improvements in Valves, of which the following, when taken in connection with the drawing accompanying and forming a part hereof, is a full and complete description, sufficient to enable those skilled in the art to which it pertains to understand, make, and use the same.

This invention relates to valves used to control the steam supply to radiators in vacuum steam heating systems, particularly to such systems wherein the steam supplied to the radiators of the system is at times above and at times below atmospheric pressure. And the object of this invention is to obtain a valve which will operate easily, will require but little attention; will not permit steam to escape therefrom when the pressure of such steam is above atmospheric pressure, and will not permit air to flow thereinto when the pressure of steam in the system is less than atmospheric pressure; and which will stand considerable wear on the movable parts of the valve, and on the parts in contact with such movable parts and continue operative as described.

A further object of the invention is to obtain a valve of the kind named which will not require much movement of the hand wheel thereof and which will not be forced off its seat when the pressure of steam on the supply side of the closed valve is above atmospheric pressure.

The drawing shows a vertical sectional view of a valve embodying this invention.

A is the casing or shell of a globe valve embodying this invention, $a$ being the inlet and $a'$ the outlet thereof.

B is the valve seat of the inlet $a$.

C is the bonnet of the casing and C', C', are the screw threads by means of which the bonnet is secured to the casing A. Bonnet C is provided with internal screw threads D, D. Screw threads D, D, are respectively of two pitches, the part $d$ thereof being of greater pitch than the part $d'$.

E is a cap provided with screw threads $e$ fitting onto corresponding screw threads C'' on bonnet C by means of which such cap is secured in place on the bonnet.

The cap E is provided with the shoulder $e'$.

F is the valve co-acting with valve seat B. $f$, $f'$, is the stem of valve F. Part $f$ of the stem $f$, $f'$, is cylindrical, fitting into the cylindrical chamber of the bonnet C and is provided with a plurality of projections G fitting into corresponding internal screw threads D of such bonnet. The valve stem $f$, $f'$, is provided with a squared recess $f''$ (indicated by dotted lines) into which the lower squared end, $h$, of stem H fits so that rotation of stem H produces corresponding rotation of the valve B. I is a hand wheel on stem H.

J is a spherical portion of stem H and $j$, $j$, are cylindrical portions of such stem.

The bonnet C is provided with the horizontal partition K through which the stem H extends. The upper surface of such partition forms table $k$.

L is a composition (or soft metal) bearing provided with the face $l$ with which face the spherical part J of the stem H comes in contact to bear upon such bearing face. Bearing face $l$ is preferably set at an angle of 45 degrees from the table $k$ on which such composition bearing rests.

M is a bushing made of hard metal. Bushing M is provided with shoulder $m$ which rests on the top of the screw threaded neck of bonnet C.

The shoulder $e'$ of cap E comes in contact with the upper end of the bushing M when the cap E is screwed to place thus forcing the bushing M firmly to place.

N is a soft metal or composition packing.

O is a coil spring. Coil spring O rests upon the upper end of the soft packing N forcing the lower end $n$ (indicated by dotted lines), of such packing onto the spherical part J of the stem H. As such soft packing N is forced onto the spherical part J of the stem the lower end thereof is forced outward into contact with the inner cylindrical face of the hard metal bushing M, sufficiently to prevent the turning of such packing.

When the cap E is screwed into place the spring O not only forces the soft packing N onto the spherical portion J of stem H but also forces such spherical portion J down onto the bearing face $l$ of the composition bearing L.

To assemble the several parts of this valve part $f$ of the stem of the valve F is placed in bonnet C with the projections G on such part $f$ in engagement with the screw threads D. The bonnet C may then be secured in place on the shell A. Composition bearing L is dropped onto the table $k$, the stem H put in place engaging with the portion $f$ of stem $f$, $f'$, the hard metal packing M and the soft or composition packing N are put into place and spring O is mounted on the stem H. The cap E is then screwed into place and the hand wheel I is secured on the end of the stem H.

The operation of the device is; when the stem H is turned (by means of hand wheel I) the lower end thereof being in engagement as described with the stem $f$, $f'$, of the valve F such stem is correspondingly turned and the projections G being in engagement with screw threads D as such stem and valve are turned they are moved longitudinally, thus moving the valve F onto or off from the valve seat B according to the direction in which the hand wheel I is turned.

When the valve F approaches to its seat the projections G are in the part $d'$ of screw threads D and such part $d'$ of such screw threads having but little pitch there is much less longitudinal movement of the valve F obtained by turning the hand wheel I a given number of degrees than when such projections G are in part $d$ of such screw threads. The part $d'$ of the screw threads D is made of low pitch so that when the valve F is seated on valve seat B it will not be forced off its seat by the pressure of steam on the under face of such valve and the part $d$ of the screw threads D is made of a different and greater pitch than is part $d'$ thereof so that after the valve F has been raised off its seat by the turning of the hand wheel I less rotation of the hand wheel is required to raise the valve F to the limit of its movement than would be required were the pitch of screw threads D uniform with the pitch of part $d'$ thereof. When thus constructed and assembled the spherical portion J of stem H forms a pivot on which such stem H turns when such stem moves out of a vertical plane as well as when it is turned in a vertical plane.

The bushing M is air and steam tight on the periphery of such bushing when it is forced to its place by screwing cap E down thereonto as hereinbefore described.

Having thus described my invention, the construction of a device embodying the same and the operation thereof, what I claim as new and desire to secure by Letters Patent is—

1. A casing provided with an inlet having a valve seat thereto and provided with an outlet, such casing also provided with internal screw threads, in combination with a valve arranged to co-act with the valve seat, such valve provided with a valve stem having a squared recess therein, projections on the stem of the valve arranged to engage with the screw threads in the casing, an additional stem provided with a spherical portion and with a squared portion fitting into the squared recess in the valve stem, a horizontal table in the casing and a bearing on such table, such bearing arranged to receive the thrust of the spherical portion of the additional stem, a hard metal bushing in the casing and a soft packing within the bushing, such soft packing arranged to be forced on to the spherical portion of the additional stem and against the inner cylindrical wall of the hard metal bushing, and a spring in the casing arranged to be forced down on to the soft packing; substantially as described.

2. A casing provided with a valve seat and with an outlet, such casing also provided with internal screw threads, in combination with a valve to co-act with the valve seat, such valve provided with a valve stem having a cylindrical portion to fit the cylindrical portion of the casing and provided with a squared recess therein, projections on the cylindrical portion of the stem of the valve arranged to fit in the screw threads in the casing, an additional stem provided with a spherical portion and with a squared portion, such squared portion fitting into the squared recess in the stem of the valve, a horizontal table in the casing, a bearing on the table, such table and bearing provided with an aperture through which the additional stem passes and such bearing arranged to receive the thrust of the spherical portion of the additional stem, a hard metal bushing in the casing, a soft packing within the bushing, such soft packing arranged to be forced on to the spherical portion of the additional stem and against the inner cylindrical wall of the hard metal bushing, and means to force such packing on to such spherical portion; substantially as described.

3. A casing provided with an inlet having a valve seat thereto and provided with an outlet, such casing also provided with internal screw threads of more than one pitch respectively, in combination with a valve arranged to co-act with the valve seat, such valve provided with a valve stem having a squared recess therein, projections on the stem of the valve arranged to engage with the screw threads in the casing, an additional stem provided with a spherical portion and with a squared portion fitting into the squared recess in the valve stem, a composition bearing in the casing arranged to receive the thrust of the spherical portion of the additional stem, a hard metal bushing in the casing and a soft packing within the bushing, such soft packing arranged to be forced on to the spherical portion of the additional stem, and a spring in the casing arranged to be forced down on to the soft packing; substantially as described.

4. A three part casing, comprising a body part, a bonnet provided with screw threads engaging with corresponding screw threads in the body part and a cap provided with screw threads engaging with corresponding screw threads on the bonnet, the body part of such casing provided with a valve seat and with an outlet and the bonnet provided with internal screw threads, and with a horizontal table having an opening therethrough, in combination with a valve arranged to co-act with the valve seat, a valve stem to such valve, projections on the stem arranged to engage with the internal screw threads in the bonnet, such valve stem provided with a squared recess therein, an additional stem provided with a spherical portion and with a squared portion, such squared portion fitting into the squared recess in the valve stem, a composition bearing on the horizontal table in the casing; such composition bearing arranged to receive the thrust of the spherical portion of the additional stem, a hard metal bushing provided with a shoulder arranged to rest on the upper end of the bonnet and to have the cap forced thereonto, a soft packing within the bushing, such soft packing arranged to be forced on to the spherical portion of the additional stem, and a spring in the cap arranged to be forced on to the soft packing; substantially as described.

5. A three part casing comprising a body part, a bonnet provided with screw threads arranged to engage with corresponding screw threads in the body part and a cap provided with screw threads arranged to engage with corresponding screw threads in the bonnet, the body part of such casing provided with a valve seat and with an outlet and the bonnet provided with internal screw threads having more than one pitch thereto and with a horizontal table having an opening therethrough, in combination with a valve arranged to co-act with the valve seat, a valve stem to such valve, projections on the valve stem respectively arranged to engage with the internal screw threads in the bonnet, such valve stem provided with a squared recess therein, an additional stem provided with a spherical portion and with a squared portion and such squared portion arranged to fit into the squared recess in the valve stem, a composition bearing on the horizontal table, such composition bearing arranged to receive the thrust of the spherical portion of the additional stem, a hard metal bushing provided with a shoulder, such shoulder arranged to rest on the upper edge of the bonnet and to have the cap forced thereonto, a soft packing within the bushing to rest on the spherical portion of the additional stem and a spring in the cap arranged to be forced on to the soft packing; substantially as described.

Signed at Chicago, Illinois, this 27th day of November, 1907.

LEWIS WATSON EGGLESTON.

In the presence of—
CHARLES TURNER BROWN,
CORA A. ADAMS.